(12) United States Patent
Cheng

(10) Patent No.: US 8,958,036 B2
(45) Date of Patent: Feb. 17, 2015

(54) LIQUID CRYSTAL PANEL, LIQUID CRYSTAL DISPLAY DEVICE AND MANUFACTURING METHOD OF ARRAY SUBSTRATE THEREOF

(75) Inventor: Yangling Cheng, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 216 days.

(21) Appl. No.: 13/522,293

(22) PCT Filed: May 14, 2012

(86) PCT No.: PCT/CN2012/075424
§ 371 (c)(1),
(2), (4) Date: Jul. 13, 2012

(87) PCT Pub. No.: WO2013/155746
PCT Pub. Date: Oct. 24, 2013

(65) Prior Publication Data
US 2013/0278864 A1    Oct. 24, 2013

(30) Foreign Application Priority Data
Apr. 20, 2012  (CN) .......................... 2012 1 0118751

(51) Int. Cl.
*G02F 1/1337*    (2006.01)

(52) U.S. Cl.
USPC ............................. 349/129; 349/106; 349/130

(58) Field of Classification Search
CPC .................... G02F 1/133753; G02F 1/133512; G02F 1/133514; G02F 1/1309
USPC .......................................... 349/106, 129, 130
See application file for complete search history.

(56) References Cited

U.S. PATENT DOCUMENTS 7,253,851 B2 *   8/2007   Lee et al. ......................... 349/55
2003/0071952 A1 *  4/2003   Yoshida et al. ............... 349/141

* cited by examiner

*Primary Examiner* — Lucy Chien
(74) *Attorney, Agent, or Firm* — Andrew C. Cheng

(57) ABSTRACT

The present invention discloses a liquid crystal panel, liquid crystal display device and manufacturing method of array substrate thereof. The liquid crystal panel comprises: a color filter substrate and an array substrate, disposed with spacing, surface of array substrate facing color filter substrate being disposed with a plurality of pixel units, each of pixel units comprising a thin film transistor, a pixel electrode and a VIA connecting thin film transistor and pixel electrode; at least an auxiliary hole formed by same EPD etching as VIA being disposed between pixel units or in each pixel unit. The present invention can amplify the detection voltage, which enables monitoring VIA forming process more precisely and reliably to ensure the VIA manufacture quality.

15 Claims, 5 Drawing Sheets

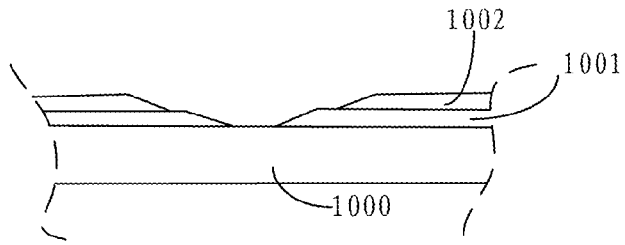

FIG 3

| forming thin film transistor as a part of each pixel unit on glass substrate, pixel unit formed in a first area of glass substrate, first area corresponding to the smallest panel division unit of glass substrate, glass substrate at least defining two first areas disposed with spacing, area between two first areas on glass substrate 10 defined as second area, peripheral area outside of all first areas on glass substrate 10 defined as third area. | S401 |

↓

| using EPD etching to form VIA on glass substrate, VIA connecting thin film transistor and pixel electrode formed in subsequent etching process, an auxiliary hole being formed in at least one of first area, second area or third area during EPD etching, and using test method of EPD etching to perform detection on concentration of etching agent and resultant in the dry etching environment forming VIA and auxiliary hole to obtain detection data; and translating the detection data into detection voltage. | S402 |

FIG 4

LIQUID CRYSTAL PANEL, LIQUID CRYSTAL DISPLAY DEVICE AND MANUFACTURING METHOD OF ARRAY SUBSTRATE THEREOF

BACKGROUND OF THE INVENTION

1. Field of the Invention

The present invention relates to the field of liquid crystal displaying techniques, and in particular to a liquid crystal panel, liquid crystal display device and manufacturing method of array substrate thereof.

2. The Related Arts

Recently, liquid crystal display device is becoming the mainstream display product in the market. A liquid crystal panel is the main component of a liquid crystal display device. In the manufacture process of liquid crystal panel, a gate metal layer, an active layer, a source metal layer, VIA and pixel electrode layer must be formed in that order on an array substrate.

In the manufacture process of VIA connecting source terminal of think film transistor and pixel electrode, VIA is formed by etching. The time control on etching VIA has great impact on the precision. The known technique uses a pre-defined etching time to form VIA.

However, the actual etching time required to form VIA depends on the film thickness obtained during the prior manufacture process. The film thickness in prior manufacture process is hard to control, and hence the actual etching time required to form VIA is hard to predefine precisely. Under such circumstances, the problems of too long or too short the predefined etching time persists.

SUMMARY OF THE INVENTION

The technical issue to be addressed by the present invention is to provide a liquid crystal display panel, liquid crystal display device, and manufacturing method of array substrate thereof, by amplifying detection voltage in the end point detector mode (EPD) technique to monitor the VIA forming process precisely and reliably to ensure the VIA manufacturing quality.

The present invention provides a liquid crystal panel, which comprises: a color filter substrate and an array substrate, disposed with spacing, the array substrate being an array substrate of multi-domain vertical alignment (MVA) display device; surface of array substrate facing color filter substrate being disposed with a plurality of pixel units, each of pixel units comprising a thin film transistor, a pixel electrode and a VIA connecting thin film transistor and pixel electrode; wherein at least an auxiliary hole formed by the same EPD etching as VIA being disposed between pixel units or in each pixel unit, auxiliary hole being disposed close to one end of the pixel electrode; and surface of color filter substrate facing array substrate being disposed with black matrix, black matrix shielding auxiliary hole.

According to a preferred embodiment of the present invention, area of auxiliary hole is larger than area of VIA.

According to a preferred embodiment of the present invention, auxiliary hole is disposed close to data line of the pixel electrode.

The present invention provides a liquid crystal display device, which comprises: a liquid crystal panel and a backlight module; wherein the liquid crystal panel further comprises: a color filter substrate and an array substrate, disposed with spacing; surface of array substrate facing color filter substrate being disposed with a plurality of pixel units, each of pixel units comprising a thin film transistor, a pixel electrode and a VIA connecting thin film transistor and pixel electrode; wherein at least an auxiliary hole formed by the same EPD etching as VIA being disposed between pixel units or in each pixel unit.

According to a preferred embodiment of the present invention, surface of color filter substrate facing array substrate is disposed with black matrix, and black matrix shields auxiliary hole.

According to a preferred embodiment of the present invention, the array substrate is an array substrate of multi-domain vertical alignment (MVA) display device, and the auxiliary hole is disposed close to one end of the pixel electrode.

According to a preferred embodiment of the present invention, auxiliary hole is disposed close to data line of the pixel electrode.

According to a preferred embodiment of the present invention, area of auxiliary hole is larger than area of VIA.

The present invention provides a manufacturing method of array substrate, which comprises the steps of: forming thin film transistor as a part of each pixel unit on glass substrate, pixel unit formed in a first area of the glass substrate, the first area corresponding to the smallest panel division unit of the glass substrate, the glass substrate at least defining two first areas disposed with spacing, area between two first areas defined as second area, peripheral area outside of all first areas on the glass substrate defined as third area; using EPD etching to form VIA on the glass substrate, VIA connecting thin film transistor and pixel electrode formed in subsequent etching process, an auxiliary hole being formed in at least one of the first area, the second area or the third area during EPD etching, and using test method of EPD etching to perform detection on concentration of etching agent and resultant in the dry etching environment forming VIA and auxiliary hole to obtain detection data; and translating the detection data into detection voltage.

According to a preferred embodiment of the present invention, the step of forming auxiliary hole comprise: forming auxiliary hole on the glass substrate at location corresponding to the black matrix on color filter substrate.

According to a preferred embodiment of the present invention, the step of forming auxiliary hole comprise: forming auxiliary hole and disposing auxiliary hole close to one end of pixel electrode.

According to a preferred embodiment of the present invention, the step of forming auxiliary hole comprise: disposing auxiliary hole close to data line of pixel electrode.

According to a preferred embodiment of the present invention, the step of forming auxiliary hole comprise: disposing auxiliary hole at location in the second area or the third area with less electric circuits.

According to a preferred embodiment of the present invention, the array substrate hole comprise: fourth area existing only in isolation layer and remaining fifth area, the step of forming auxiliary hole comprising: disposing auxiliary hole in fourth area.

According to a preferred embodiment of the present invention, the step of forming auxiliary hole comprise: forming auxiliary hole and making area of auxiliary hole larger than area of VIA.

The efficacy of the present invention is that to be distinguished from the state of the art. The present invention disposes auxiliary hole in the pixel unit formed at the same time as VIA. The addition of non-functional auxiliary hole is equivalent to having additional detection object in EPD etching process so as to effectively amplify the detection voltage corresponding to detection data, which enables monitoring VIA forming process more precisely and reliably to ensure the VIA manufacture quality.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings:

FIG. 3 is a cross-sectional view along AB direction of auxiliary hole of FIG. 2;

FIG. 4 is a flowchart of the first embodiment of the manufacturing method of array substrate according to the present invention;

DETAILED DESCRIPTION OF THE PREFERRED EMBODIMENTS

The following describes the embodiments of the array substrate and the test method thereof according to the present invention.

Figure 1:
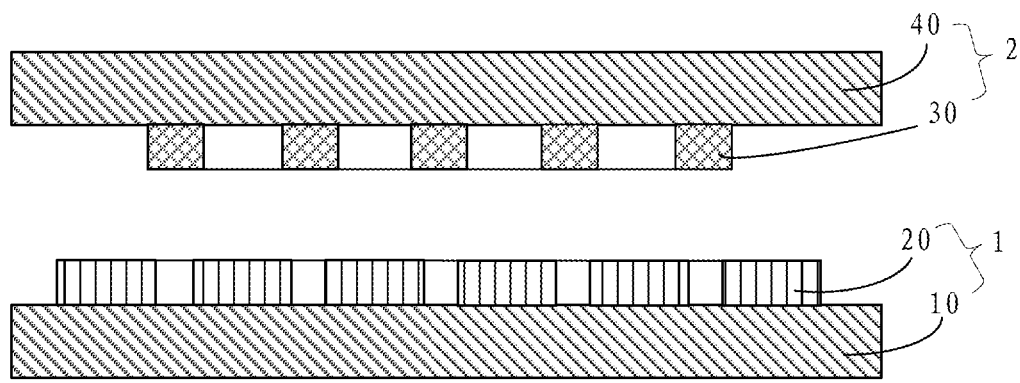
FIG. 1 is a schematic cross-sectional view showing the structure of the liquid crystal panel according to the present invention.
Figure 2:
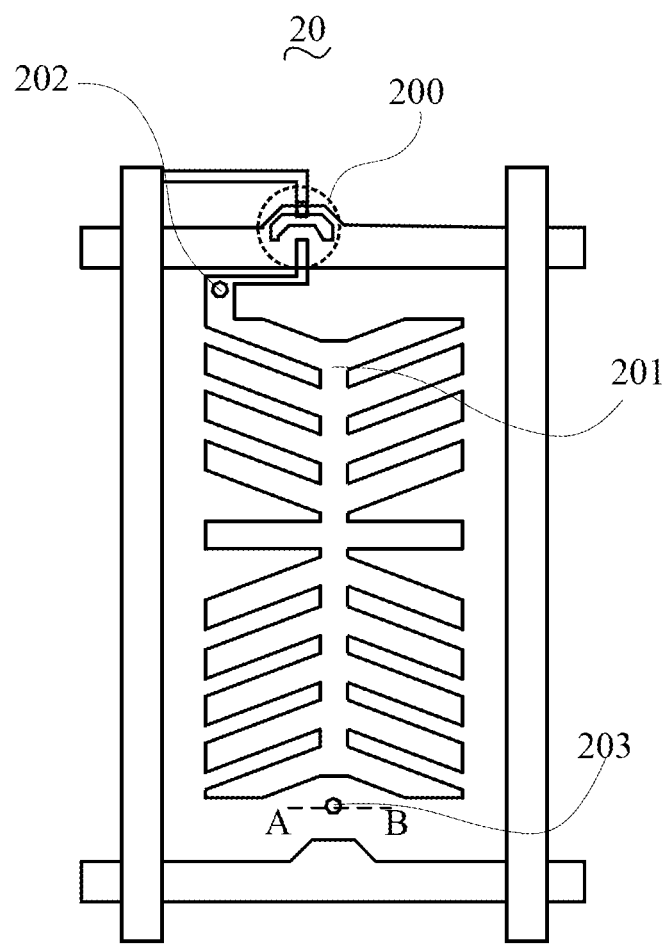
FIG. 2 is a top view of each pixel unit of the liquid crystal panel shown in FIG. 1.

Refer to FIG. 1 and FIG. 2. An embodiment of liquid crystal panel comprises an array substrate 1 and a color filter substrate 2; wherein array substrate 1 further comprises a glass substrate 10 and pixel unit 20, and color filter 2 further comprises black matrix 30 and a glass substrate 40.

Array substrate 1 and color filter substrate 2 are disposed with a separating space. Surface of glass substrate 10 facing color filter substrate 2 is disposed with a plurality of pixel units 20. Pixel units 20 can be arranged in a matrix format.

Each of pixel units 20 comprises a thin film transistor 200, a pixel electrode 201 and VIA connecting thin film transistor 200 and pixel electrode 201; wherein pixel unit 20 comprises at least an auxiliary hole 203 formed in the same EPD etching process as VIA 202. In the instant embodiment, black matrix 30 is disposed on surface of color filter substrate 2 facing array substrate 1. Black matrix 30 shields auxiliary hole 203 so that auxiliary hole 203 will not affect display area of pixel unit 20. Black matrix 30 can also be designed not to shield auxiliary hole 203.

Array substrate 1 is an array substrate of multi-domain vertical alignment (MVA) display device, and auxiliary hole 203 is disposed close to one end of pixel electrode 201, such as, close to location of data line of pixel electrode 201.

Referring to FIG. 3, FIG. 3 is a cross-sectional view along AB direction of auxiliary hole of FIG. 2. Auxiliary hole 203 is formed at the same time as VIA 202, that is, when etching film layer on glass substrate 10 until reaching surface of glass substrate 10. For example, etching auxiliary hole 203 through insulation layer 1001 and protective layer 1002 on surface of glass substrate 10. Bottom of auxiliary hole 203 is upper surface of glass substrate 10. It is worth noting that in the instant embodiment, area of auxiliary hole 203 is usually larger than area of VIA 202. Depending on actual application, the area of auxiliary hole 203 can also be equal to or smaller than the area of VIA 202.

In the present embodiment of the present invention, auxiliary hole 203 formed at the same time as VIA is disposed in pixel unit 20. The addition of non-functional auxiliary hole 203 is equivalent to having additional detection object in EPD etching process so as to effectively amplify the detection voltage corresponding to detection data, which enables monitoring VIA forming process more precisely and reliably to ensure the VIA manufacture quality.

Furthermore, the present invention also provides a liquid crystal display device, which comprises a backlight module (not shown) and the aforementioned liquid crystal panel. The backlight module supplies light to the liquid crystal panel.

The present invention further provides an embodiment of array manufacturing method of array substrate, as shown in FIG. 4. Also referring to FIG. 1, FIG. 2 and FIG. 5, the first embodiment of manufacturing method of array substrate of the present invention comprises the steps of:

Step S401: forming thin film transistor 200 as a part of each pixel unit 20 on glass substrate 10, pixel unit 20 formed in a first area 100 of glass substrate 10, first area 100 corresponding to the smallest panel division unit of glass substrate 10, glass substrate 10 at least defining two first areas 100 disposed with spacing, area between two first areas 100 on glass substrate 10 defined as second area 101, peripheral area outside of all first areas 100 on glass substrate 10 defined as third area 102.

Step S402: using EPD etching to form VIA 202 on glass substrate 10, VIA 202 connecting thin film transistor 200 and pixel electrode 201 formed in subsequent etching process, an auxiliary hole 203 being formed in at least one of first area 100, second area 101 or third area 102 during EPD etching, and using test method of EPD etching to perform detection on concentration of etching agent and resultant in the dry etching environment forming VIA 202 and auxiliary hole 203 to obtain detection data; and translating the detection data into detection voltage.

Figure 5:
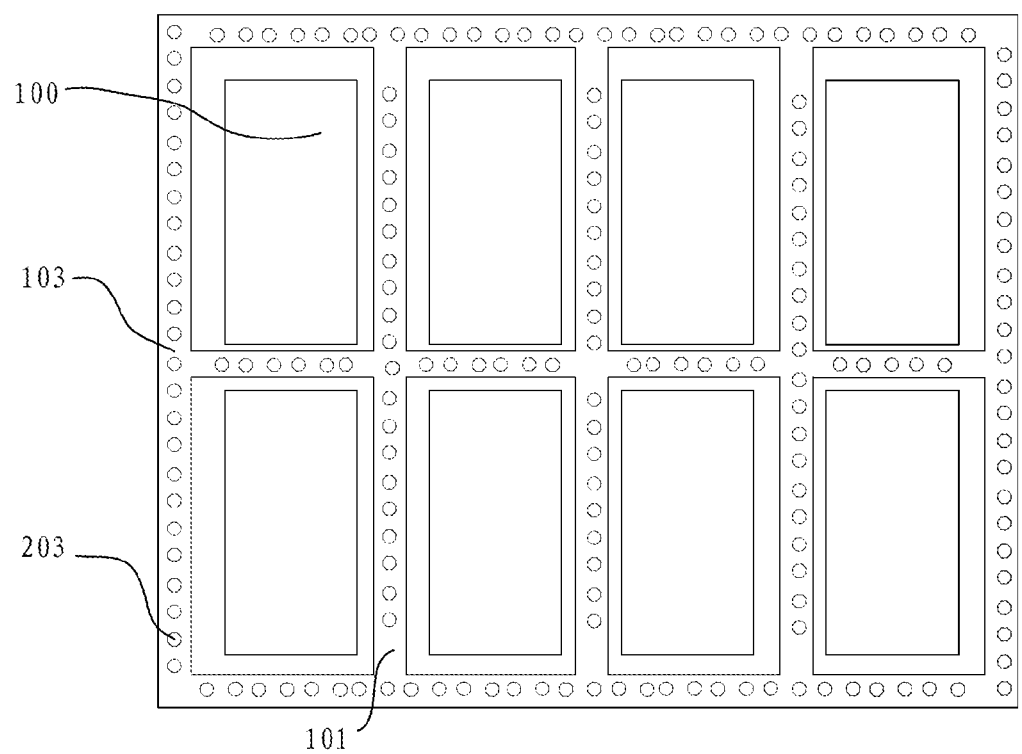
FIG. 5 is a top view of array substrate manufactured in the step of forming auxiliary hole as in FIG. 4.
Figure 6:
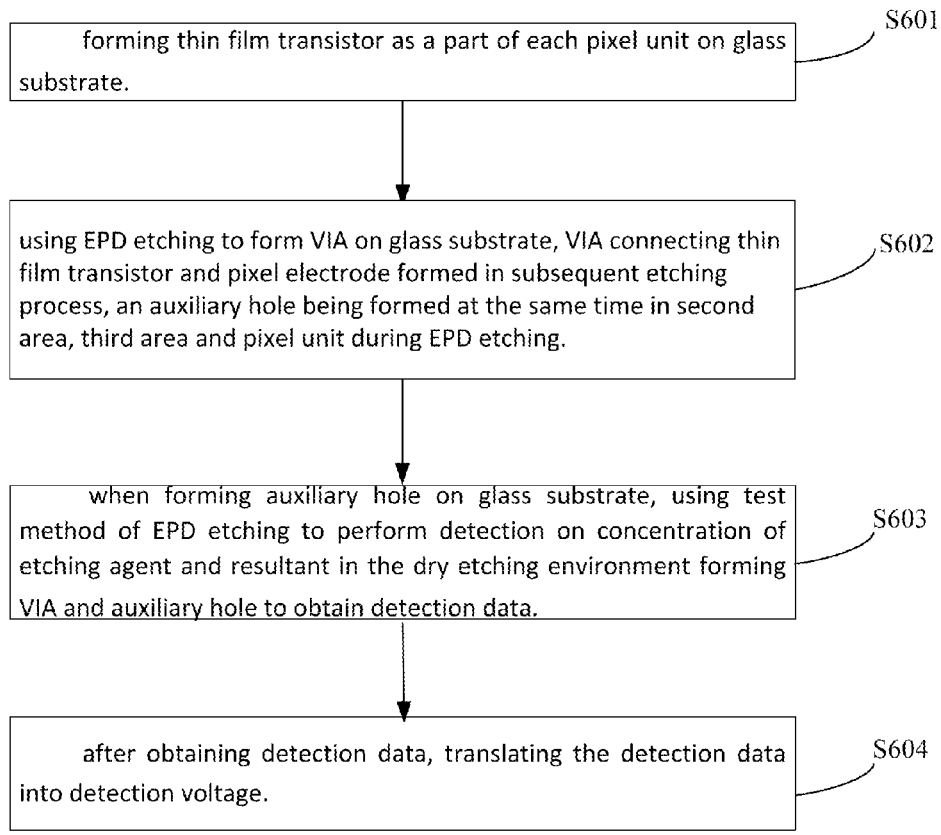
FIG. 6 is a flowchart of the second embodiment of the manufacturing method of array substrate according to the present invention.

Specifically, referring to FIG. 6, FIG. 6 is a flowchart of the second embodiment of the manufacturing method of array substrate according to the present invention. Also referring to FIG. 1, FIG. 2 and FIG. 5, the steps in FIG. 4 can more specifically comprise the following sub-steps:

Step S601: forming thin film transistor 200 as a part of each pixel unit 20 on glass substrate 10.

Glass substrate 10 comprises: first area 100, second area 101 and third area 102.

One or more liquid crystal panels can be fabricated through exposure on glass substrate 10. After array substrate is formed, each array substrate 1 corresponding to each liquid crystal panel comprises a plurality of pixel units to realize the objective of display.

Step S602: using EPD etching to form VIA 202 on glass substrate 10, VIA 202 connecting thin film transistor 200 and pixel electrode 201 formed in subsequent etching process, an auxiliary hole 203 being formed at the same time in second area 101, third area 102 and pixel unit 20 during EPD etching.

Each of pixel units 20 comprises thin film transistor 200, pixel electrode 201 and VIA 202. Thin film transistor 200 acts as switch of pixel unit 20 to control pixel electrode 201 whether to generate electric field and how to generate electric field. VIA 202 is for connecting thin film transistor 200 and pixel electrode 201. In addition to VIA 202 formed in pixel unit 20 on glass substrate 10, auxiliary hole 203 is also formed. Auxiliary hole 203 and VIA 202 are both formed at the same time by EPD etching on glass substrate 10.

In addition, step S602 further comprises: forming auxiliary hole 203 on glass substrate 10 at location corresponding to black matrix 30 on color filter substrate 2. Also, when forming auxiliary hole 203, auxiliary hole 203 is disposed close to one end of pixel electrode 201, for instance, at location close to data line of pixel electrode 201. In an actual application, auxiliary hole 203 can also be disposed at location in second area 101 or third area 102 with less electric circuits.

The structure formed with the above method can make black matrix 30 shield auxiliary hole 203 to prevent from affecting display quality of pixel unit 20.

Number of auxiliary hole 20 disposed in pixel unit 20 is one. But, depending on application, a plurality of auxiliary holes 203 can also be disposed to improve the signal of detection voltage 300.

Second area 101 is located between two first areas 100. Second area 101 can be disposed with test electric circuit when necessary. When second area 101 is not disposed with test electric circuit, auxiliary hole 203 is still formed in second area 101. When second area 101 is disposed with test electric circuit, auxiliary hole 203 is formed at locations with less test electric circuit so as to prevent auxiliary hole 203 from affecting and damaging test circuit.

Number of auxiliary holes 203 disposed in second area 101 can be plural. By increasing the number of auxiliary holes 203, detection voltage 300 signal can be improved.

The peripheral area outside all of first areas 100 on glass substrate 10 is defined as third area 102. Third area 102 can be disposed with test electric circuit when necessary. Furthermore, auxiliary hole 203 is formed at locations with less test electric circuit so as to prevent auxiliary hole 203 from affecting and damaging test circuit.

Number of auxiliary holes 203 disposed in third area 102 can be plural. By increasing the number of auxiliary holes 203, detection voltage 300 signal can be improved.

On the other hand, glass substrate 10 can define fourth area only existing in insulation layer and remaining fifth area. In the instant embodiment, auxiliary holes 203 disposed in second area 101, third area 102 and pixel unit 20 can all be disposed in fourth area to prevent auxiliary 203 from affecting and damaging circuit in liquid crystal panel 103 and display quality of pixel unit 20.

Second area 101, third area 102 and pixel unit 20 can all be disposed with auxiliary holes 203. Alternatively, one or two of second area 101, third area 102 and pixel unit 20 can be disposed with auxiliary hole 203 improve detection voltage 300 signal.

In the instant embodiment, when forming auxiliary hole 203, the area of auxiliary hole 203 can be made to be larger than area of VIA 202 so as to effectively change the concentration of etching agent and resultant.

Step S603: when forming auxiliary hole 203 on glass substrate 10, using test method of EPD etching to perform detection on concentration of etching agent and resultant in the dry etching environment forming VIA 202 and auxiliary hole 203 to obtain detection data.

Detection data can reflect the concentration of etching agent and resultant to reflect more truthfully the forming process of VIA 202 and auxiliary hole 203.

Step S604: after obtaining detection data, translating the detection data into detection voltage 300.

Detection voltage 300 can directly reflect the forming process of VIA 202 and auxiliary hole 203.

Figure 7:
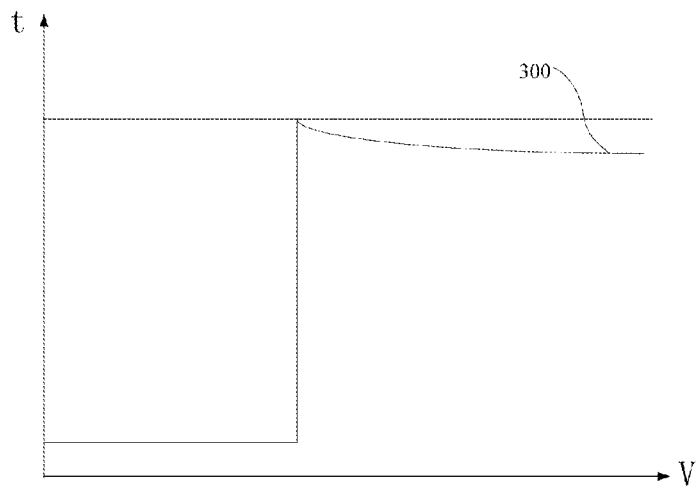
FIG. 7 is a plot of the relation between the detection voltage and dry etching time in known technique using EPD etching.
Figure 8:
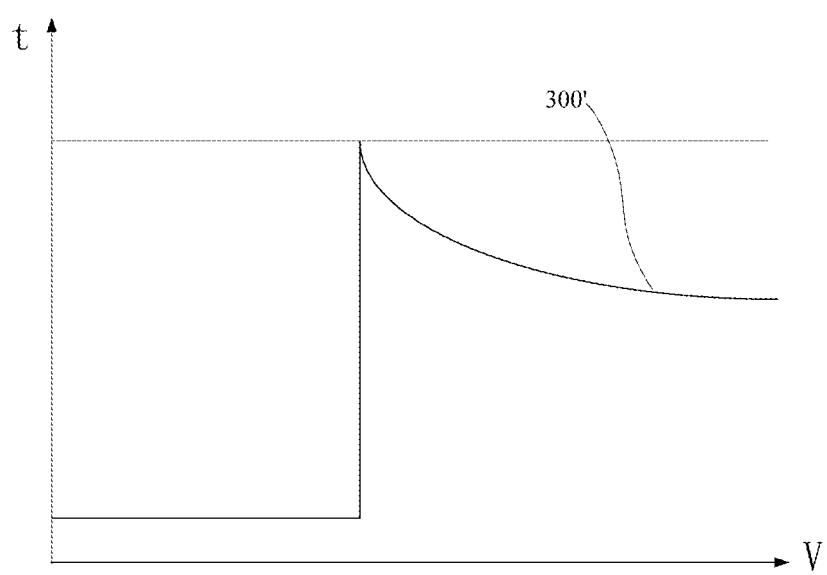
FIG. 8 is a plot of the relation between the detection voltage and dry etching time in the array substrate manufacturing method using EPD etching according to the present invention.

As shown in FIG. 7 and FIG. 8, FIG. 7 is a plot of the relation between the detection voltage 300 and dry etching time in known technique using EPD etching, and FIG. 8 is a plot of the relation between the detection voltage 300' and dry etching time in the array substrate manufacturing method using EPD etching according to the present invention. Refer also to FIG. 5. As shown in the plots, when one or more of second area 101, third area 102 and pixel unit 20 is disposed with auxiliary hole 203, signal intensity of detection voltage 300' is far higher than signal intensity of detection voltage 300 when none of second area 101, third area 102 and pixel unit 20 is disposed with auxiliary hole 203.

It should be understood that because the number of VIA 202 is limited and the area of VIA 202 is small in thin film transistor manufacture process, the voltage change is small after using EPD etching to translate detection data into reference voltage, and the voltage cannot effectively reflect the concentration change of the resultant in vacuum dry etching environment, which lead to difficulty in ensuring VIA 202 manufacture quality. The present invention uses auxiliary hole 203 formed at the same time when forming VIA 202, that is, forming auxiliary hole 203 in second area 101, third area 102 and/or pixel unit 20, which leads to the total number of VIA 202 and auxiliary holes 203 increases. As the total number of VIA 202 and auxiliary holes 203 increases, the concentration of etching solution during dry etching and the concentration of resultant after etching also increase. EPD etching can translate detection data on concentration change into detection voltage 300', which leads to improving the signal intensity of detection voltage 300' to enable precise and reliable monitoring of VIA 202 formation.

In summary, the present invention disposes auxiliary hole 203 in pixel unit 20 formed at the same time as VIA 202. The addition of non-functional auxiliary hole 203 is equivalent to having additional detection object in EPD etching process so as to effectively amplify the detection voltage corresponding to detection data, which enables monitoring VIA forming process more precisely and reliably to ensure the VIA manufacture quality.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A liquid crystal panel, which comprises:
a color filter substrate and an array substrate, disposed with spacing, the array substrate being an array substrate of multi-domain vertical alignment (MVA) display device, and defined with first areas, each corresponding to the smallest panel division unit, second areas, each defined between two of the first areas, and a peripheral area outside the first areas;
wherein a surface of the array substrate facing the color filter substrate is disposed with a plurality of pixel units, each of the pixel units comprises a thin film transistor, a pixel electrode and a VIA connecting a thin film transistor and a pixel electrode, and is formed in one of the first areas;

wherein at least an auxiliary hole formed by the same EPD etching as the VIA is disposed in at least one of the second areas and/or the peripheral area; and a surface of the color filter substrate facing the array substrate being disposed with a black matrix, the black matrix shielding the auxiliary hole.

2. The liquid crystal panel as claimed in claim 1, characterized in that area of the auxiliary hole is larger than area of the VIA.

3. The liquid crystal panel as claimed in claim 1, characterized in that the auxiliary hole is disposed close to a data line of the pixel electrode.

4. A liquid crystal display device, which comprises:
a liquid crystal panel;
a backlight module, the backlight module supplying light to the liquid crystal panel;
wherein the liquid crystal panel further comprises: a color filter substrate and an array substrate, disposed with spacing, the array substrate being defined with first areas, each corresponding to the smallest panel division unit, second areas, each defined between two of the first areas, and a peripheral area outside the first areas;
a surface of array substrate facing the color filter substrate being disposed with a plurality of pixel units, each of the pixel units comprising a thin film transistor, a pixel electrode and a VIA connecting a thin film transistor and a pixel electrode, and is formed in one of the first areas; and
wherein at least an auxiliary hole formed by same EPD etching as VIA is disposed in at least one of the second areas and/or the peripheral area.

5. The liquid crystal display device as claimed in claim 4, characterized in that a surface of color filter substrate facing array substrate is disposed with a black matrix, and the black matrix shields the auxiliary hole.

6. The liquid crystal display device as claimed in claim 4, characterized in that the array substrate is an array substrate of multi-domain vertical alignment (MVA) display device, and the auxiliary hole is disposed close to one end of the pixel electrode.

7. The liquid crystal display device as claimed in claim 6, characterized in that the auxiliary hole is disposed close to a data line of the pixel electrode.

8. The liquid crystal display device as claimed in claim 4, characterized in that area of the auxiliary hole is larger than area of the VIA.

9. A manufacturing method of array substrate, which comprises the steps of:

forming a thin film transistor as a part of each pixel unit on glass substrate, a pixel unit formed in a first area of the glass substrate, the first area corresponding to the smallest panel division unit of the glass substrate, the glass substrate at least defining two first areas disposed with spacing, an area between two first areas defined as a second area, peripheral area outside of all first areas on the glass substrate defined as a third area; and using EPD etching to form a VIA on the glass substrate, wherein the VIA connects the thin film transistor and the pixel electrode formed in subsequent etching process, an auxiliary hole being formed in at least one of the first area, the second area or the third area during EPD etching, and using a test method of EPD etching to perform detection on concentration of etching agent and resultant in the dry etching environment forming the VIA and the auxiliary hole to obtain detection data; and translating the detection data into detection voltage.

10. The manufacturing method as claimed in claim 9, wherein:
the step of forming the auxiliary hole comprises: forming the auxiliary hole on the glass substrate at a location corresponding to the black matrix on color filter substrate.

11. The manufacturing method as claimed in claim 9, wherein:
the step of forming the auxiliary hole comprises: forming the auxiliary hole and the disposing auxiliary hole close to one end of pixel electrode.

12. The manufacturing method as claimed in claim 11, wherein:
the step of forming the auxiliary hole comprises: disposing the auxiliary hole close to a data line of pixel electrode.

13. The manufacturing method as claimed in claim 9, wherein:
the step of forming the auxiliary hole comprises: disposing the auxiliary hole at a location in the second area or the third area with less electric circuits.

14. The manufacturing method as claimed in claim 13, wherein: the array substrate hole comprises a fourth area existing only in an isolation layer and a remaining fifth area, the step of forming the auxiliary hole comprising: disposing the auxiliary hole in the fourth area.

15. The manufacturing method as claimed in claim 9, wherein: the step of forming the auxiliary hole comprises: forming the auxiliary hole and making an area of the auxiliary hole larger than area of VIA.

* * * * *